US 6,686,904 B1

(12) United States Patent
Sherman et al.

(10) Patent No.: US 6,686,904 B1
(45) Date of Patent: Feb. 3, 2004

(54) WHEEL REPORTING METHOD FOR A PERSONAL COMPUTER KEYBOARD INTERFACE

(75) Inventors: Nathan C. Sherman, Sammamish, WA (US); Brian D. Williams, Redmond, WA (US); Steven N. Bathiche, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 296 days.

(21) Appl. No.: 09/823,714

(22) Filed: Mar. 30, 2001

(51) Int. Cl.[7] .................................................. G09G 5/00
(52) U.S. Cl. ........................ 345/168; 345/156; 345/157; 341/22; 364/189; 400/472; 400/477; 400/478
(58) Field of Search ................................. 345/156, 157, 345/159, 168, 204, 970, 973, 979; 341/22; 369/188, 189; 400/472, 477, 478, 479

(56) References Cited

U.S. PATENT DOCUMENTS

| | | | | |
|---|---|---|---|---|
| 4,991,117 A | * | 2/1991 | Iwamura et al. | 345/686 |
| 5,473,344 A | | 12/1995 | Bacon et al. | 345/163 |
| 5,877,758 A | * | 3/1999 | Seybold | 345/866 |
| 5,912,661 A | | 6/1999 | Siddiqui | 345/166 |
| 6,040,516 A | * | 3/2000 | Masuda | 84/622 |
| 6,246,397 B1 | * | 6/2001 | Vossler | 345/204 |
| 6,263,392 B1 | * | 7/2001 | McCauley | 710/305 |
| RE37,422 E | * | 10/2001 | Yamada et al. | 84/600 |
| 6,312,175 B1 | * | 11/2001 | Lum | 400/472 |
| 6,323,873 B1 | * | 11/2001 | Liebenow | 345/619 |
| 6,406,300 B1 | * | 6/2002 | Cohen | 434/227 |
| 6,429,793 B1 | * | 8/2002 | Paolini | 341/22 |
| 6,494,375 B1 | * | 12/2002 | Ishibashi et al. | 235/462.11 |

OTHER PUBLICATIONS

Microsoft Corporation, Windows Platform Design Notes, "Keyboard Scan Code Specification," Revision 1.3a, Mar. 16, 2000, available online at http:www/microsoft.com/hwdev/desinit/ScanCode.htm#USB, pp. 1–34.

* cited by examiner

*Primary Examiner*—Amare Mengistu
*Assistant Examiner*—Vincent E. Kovalick
(74) *Attorney, Agent, or Firm*—Ronald M. Anderson

(57) ABSTRACT

A method and system that monitors movement of a wheel or slider included on a keyboard, and conveys information indicative of the movement and its direction to a host computing device to which the keyboard is coupled, using predefined scan codes or Universal Serial Bus (USB) data signal. State changes and the direction of rotation are detected as the wheel is rotated. Preferably, an elapsed time between state changes is compared to a set of threshold times, and the scan code representing the closest threshold time is selected. Alternatively, a scan code is transmitted that is indicative of the sign and magnitude of a threshold number corresponding to an accumulated number of state changes. The host computing device decodes the scan code or USB data for use in controlling a scroll distance, zoom, etc. as a function of the movement indicated by the scan code or USB data.

42 Claims, 10 Drawing Sheets

| Sent by Keyboard (Scan Set 2 make code) | Used by Host (Scan Set 1 make code) | Speed | Direction |
|---|---|---|---|
| 0xE0 0x45 | 0xE0 0x0B | 1 | Positive |
| 0xE0 0x1D | 0xE0 0x11 | 2 | Positive |
| 0xE0 0x24 | 0xE0 0x12 | 3 | Positive |
| 0xE0 0x1B | 0xE0 0x1F | 4 | Positive |
| (Scan Set 1 break code) | (Scan Set 1 break code) | Speed | Direction |
| 0xE0 0x8B | 0xE0 0x8B | 1 | Negative |
| 0xE0 0x91 | 0xE0 0x91 | 2 | Negative |
| 0xE0 0x92 | 0xE0 0x92 | 3 | Negative |
| 0xE0 0x9F | 0xE0 0x9F | 4 | Negative |

*FIG. 6A*

| Time Since Last Count (Milliseconds) | Inferred Speed (Counts per second) | Speed Value | Direction |
|---|---|---|---|
| 0-15 | > 66 | 4 | Positive |
| 16-30 | 33 - 66 | 3 | Positive |
| 31-50 | 20 - 33 | 2 | Positive |
| 50 + | < 20 | 1 | Positive |
|  |  |  |  |
| 0 - 18 | > 55 | 4 | Negative |
| 18 - 36 | 27 - 55 | 3 | Negative |
| 36 - 60 | 16 - 27 | 2 | Negative |
| 60 + | < 16 | 1 | Negative |

*FIG. 6B*

| Sent by Keyboard (Scan Set 2 make code) | Used by Host (Scan Set 1 make code) | Magnitude | Direction |
|---|---|---|---|
| 0xE0 0x45 | 0xE0 0x0B | 1 | Positive |
| 0xE0 0x1D | 0xE0 0x11 | 4 | Positive |
| 0xE0 0x24 | 0xE0 0x12 | 16 | Positive |
| 0xE0 0x1B | 0xE0 0x1F | 64 | Positive |
| (Scan Set 1 break code) | (Scan Set 1 break code) | Magnitude | Direction |
| 0xE0 0x8B | 0xE0 0x8B | 1 | Negative |
| 0xE0 0x91 | 0xE0 0x91 | 4 | Negative |
| 0xE0 0x92 | 0xE0 0x92 | 16 | Negative |
| 0xE0 0x9F | 0xE0 0x9F | 64 | Negative |

WHEEL REPORTING METHOD FOR A PERSONAL COMPUTER KEYBOARD INTERFACE

FIELD OF THE INVENTION

The present invention generally relates to a method and system for communicating user input wheel movement to a host computing device via a keyboard interface, and more specifically, to encoding wheel movement as key scan codes for input to a host computing device.

BACKGROUND OF THE INVENTION

The wheel provided as a user control on new types of computer mouse input devices has become a popular feature for scrolling pages on a computer screen, zooming a computer display, throttling speed in a computer game, and other activities. An example of a mouse that has such a wheel is illustrated in Microsoft Corporation's U.S. Pat. No. 5,473,344, entitled "3-D Cursor Positioning Device." Another example of a popular configuration that enables a mouse wheel to also act as a button is disclosed in Microsoft Corporation's U.S. Pat. No. 5,912,661, entitled, "Z-Encoder Mechanism." Such mouse input devices monitor wheel movement using sensors having variable resistance potentiometers or optical encoders. Mouse input devices using optical encoders typically employ a light source, such as a light-emitting diode (LED), and one or more light sensors, such as photo transistors. An encoder disk with a number of tabs and spaces arrayed around an outer circumference of the disk is typically disposed between the light source(s) and light sensor(s). The disk is attached to the mouse wheel and rotates about the same axis as the mouse wheel. As the mouse wheel is rotated, the tabs and spaces on the rotating encoder disk respectively interrupt and pass a light beam from the light source(s) to the light sensor(s). With each change between dark and light, output signal(s) from the light sensor(s) change state. A counter coupled to the light sensor(s) counts state changes, producing a count that indicates information such as a position, a direction of rotation, and a rotational speed of the mouse wheel. This numerical information is typically communicated to a host computing device in the form of data packets.

It would be desirable to add a wheel to a computer keyboard to provide the same functions as the mouse wheel, as noted above, so that users can rotate the wheel without moving a hand from the keyboard. However, keyboard interfaces for personal computers (PCs) are based on International Business Machines, Inc.'s Personal System/2 (PS/2) keyboard protocol, which is not intended to communicate a numeric value from a device such as a wheel to a host computer. The PS/2 protocol is designed to communicate the making and breaking of switch contacts that occur each time a key on a keyboard is depressed and released, respectively. Key events are communicated in the form of unique scan codes for each key that is depressed and released. For example, in a first set of scan codes, when the letter "a" key is depressed, a PS/2 keyboard provides a hexadecimal scan code of "1E." The host computing device recognizes the scan code as representing the letter "a." A table of scan codes and other keyboard specifications applicable to Microsoft WINDOWS™ operating systems is provided in Microsoft Corporation's Keyboard Scan Code Specification, Revision 13a dated. Mar. 16, 2000, which is available at http://www.microsoft.com/hwdev/desinit/ScanCode.htm#USB. It should be noted that two different sets of scan codes are currently commonly used, and that a third set is less frequently used, but regardless of the set of scan codes that is produced by the keyboard, the making and breaking of keys on the keyboard only produces scan codes—not values that are intended to convey a rotation or direction of a wheel. The PS/2 interface for a keyboard and the operating system software only expects to receive scan codes from a PS/2 keyboard interface. Accordingly, it will be apparent that a method must be developed that enables the movement of a wheel on a keyboard to be encoded using scan codes to enable such a wheel to be incorporated on a keyboard.

Other keyboard communication protocols are currently in use, such as the Universal Serial Bus (USB) protocol. However, the PS/2 protocol remains a widely used and simple communication means that helps keep keyboard manufacturing costs low. Thus, it is desirable to provide a method and system for encoding wheel movement as scan codes that will be readily recognized by a keyboard interface and which can be easily used with existing operating systems.

SUMMARY OF THE INVENTION

The present invention is directed to a method to represent movement of a movable element on an input device, with respect to a single axis. The movable element is included on an input device, such as a keyboard, that is adapted to be coupled to a host computing device through a keyboard interface. Movement of the element may be used to control scrolling, zooming, throttling, volume, or other functions of a host computing device. Preferably, the movable element is a wheel, but it may alternatively be a slider or other element whose motion is detected by monitoring state changes with a sensor. A state change reflecting a displacement of the element is detected, and a predefined code indicative of the movement of the element is selected as a function of the state change. Preferably, the predefined code is an unused keyboard scan code, but may alternatively be formatted for input through a USB port, or may employ other forms of switch coding.

In one preferred embodiment, the scan code represents a speed of the movable element, determined as a function of an elapsed time between successive state changes. The elapsed time between state changes is compared to a plurality of threshold times, and the predefined code representing a threshold time determined by the comparison is transmitted to the host computing device.

In another embodiment, the predefined code represents the number of state changes accumulated since the predefined code was last transmitted to the host computing device. The accumulated number of state changes is reduced by a threshold count, and a residual count is then compared to a plurality of threshold counts to determine the next predefined code that is transmitted to the host computing device. This process is repeated until the residual number of state changes is less than a predetermined minimum.

The host computing device is provided with software instructions that enable it to process the predefined code received from the keyboard and change an object displayed as a function of the predefined code. For example, the predefined code can be used to scroll the contents of a window displayed by the host computing device. An acceleration that should be applied to a displayed object can be determined by the host computing device, based upon comparison of successive predefined codes received from the keyboard.

Another aspect of the present invention is directed to a machine-readable medium, disposed in the keyboard, which stores machine-readable instructions that cause the steps of the method described above to be implemented.

Yet another aspect of the present invention is directed to a keyboard that includes a movable element, a state change detector that senses a direction and displacement of the movable element, a memory that stores machine instructions and a plurality of predefined codes, and a processor that communicates with the state change detector and memory and executes the machine instructions. These machine instructions cause the processor to carry out functions that are generally consistent with the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 6A is a table listing scan codes and corresponding speeds for the wheel or slider;

FIG. 6B is a table listing speeds as a function of the elapsed time in milliseconds between successive counts;

DESCRIPTION OF THE PREFERRED EMBODIMENT

Exemplary Operating Environment

Figure 1:
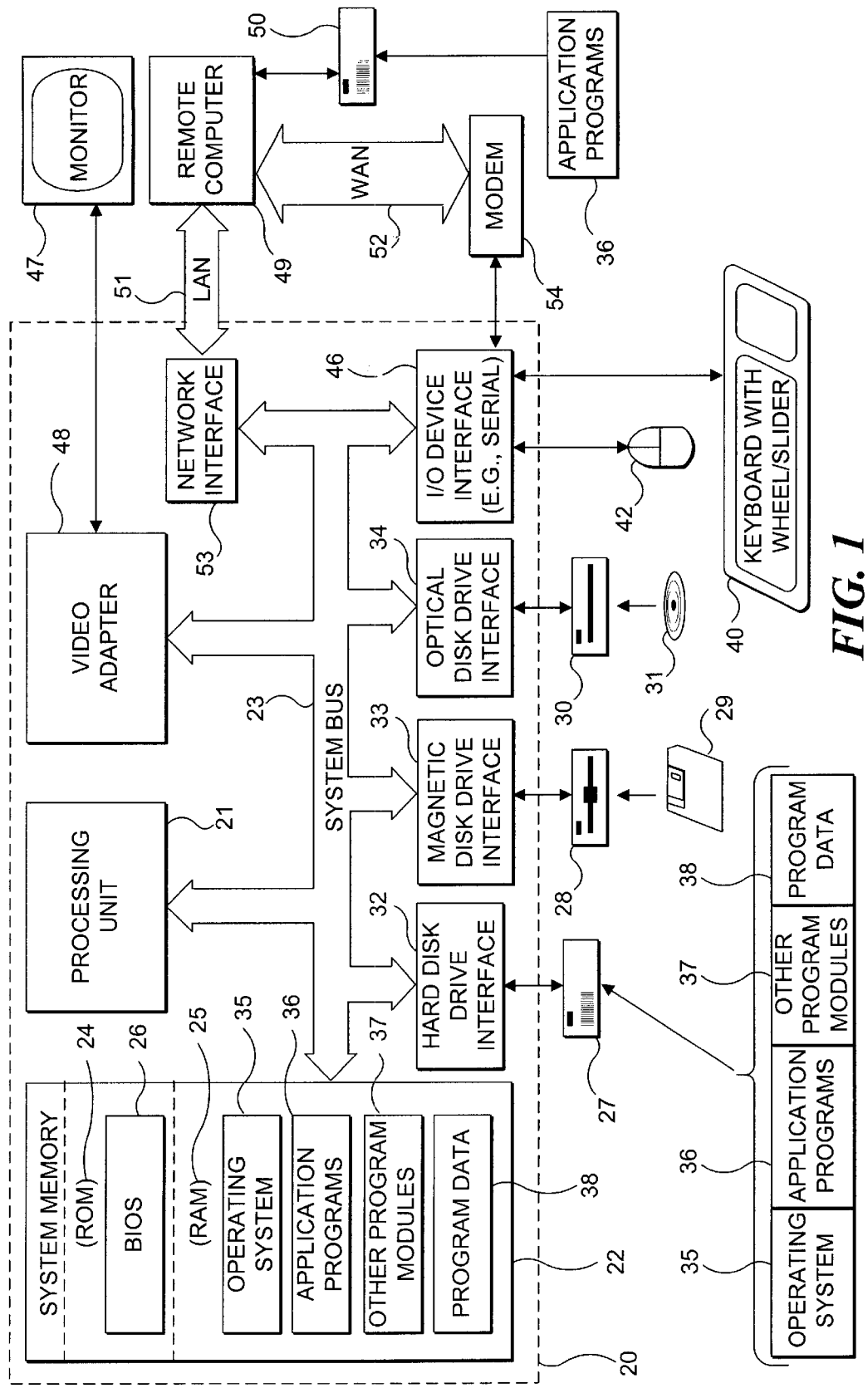
FIG. 1 is a schematic block diagram of an exemplary PC system suitable for implementing the present invention.

FIG. 1 and the following discussion are intended to provide a brief, general description of a suitable host computing device with which the present invention may be used. Although not required, the present invention will typically be used with a host computing device that executes computer instructions, such as program modules. These computer instructions are executed by a processor in the host computing device computer. In addition, the keyboard includes a processor that executes machine instructions to transmit scan code or USB-formatted signals to the host computing device to indicate the movement of a movable element on the keyboard, including its direction and either its speed or extent of movement.

Generally, program modules implemented on the host computing device (some of which will be used in connection with the present invention) include routines, programs, objects, components, data structures, etc. that perform particular tasks or implement particular abstract data types. Moreover, those skilled in the art will appreciate that this invention may be practiced with other types of host computing devices, including hand-held devices, pocket personal computing devices, programmable consumer electronic devices, multiprocessor systems, network PCs, laptop computers, minicomputers, mainframe computers, and the like. The invention may also be practiced with computing devices in distributed computing environments that include remote processing devices linked through a communications network. In a distributed computing environment, program modules may be located in both local and remote memory storage devices.

With reference to FIG. 1, an exemplary computing system for use with the present invention includes a general purpose computing device in the form of a conventional PC 20, provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within PC 20, such as during start up, is stored in ROM 24. PC 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31, such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer-readable media provide nonvolatile storage of computer-readable machine instructions, data structures, program modules and other data for PC 20. Although the exemplary environment described herein employs a hard disk, removable magnetic disk 29, and removable optical disk 31, it will be appreciated by those skilled in the art that other types of computer-readable media, which can store data that is accessible by a computer, such as magnetic cassettes, flash memory cards, digital video disks, Bernoulli cartridges, RAMs, ROMs, and the like, may also be used in the exemplary operating environment. A number of program modules may be stored on the hard disk, magnetic disk 29, optical disk 31, ROM 24, or RAM 25, including an operating system 35, one or more application programs 36, other program modules 37, and program data 38.

Figure 2A:
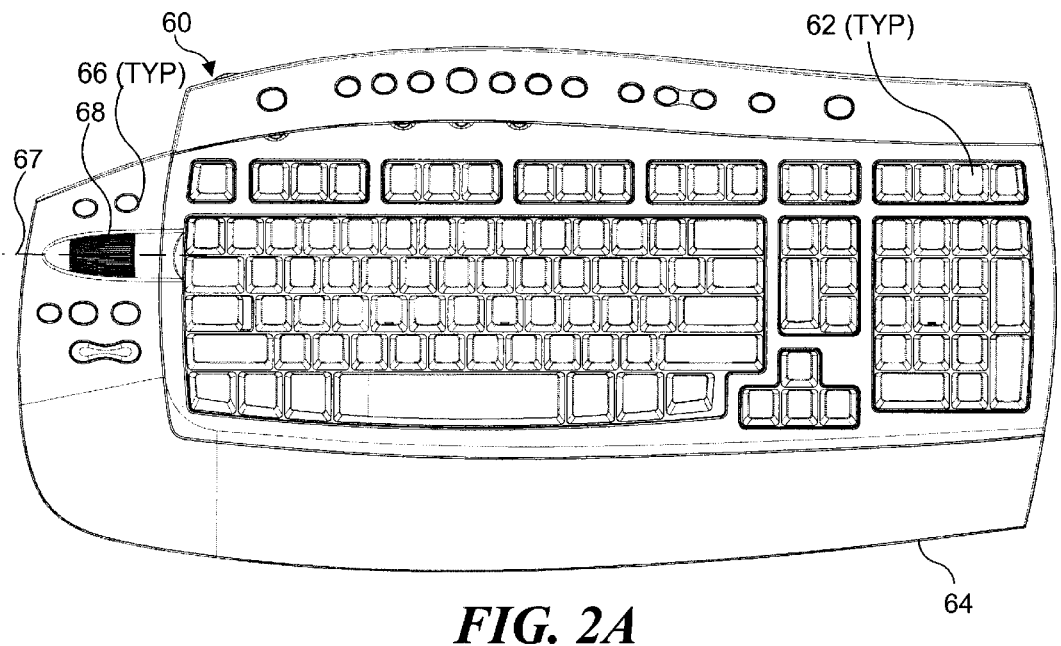
FIGS. 2A and 2B illustrate preferred embodiments of a keyboard that respectively include a wheel and a slider.

A user may enter commands and information into PC 20 through input devices such as a keyboard 40 that includes a wheel or slider in accord with the present invention, and through a separate pointing device 42. Further detail regarding keyboard 40 is described below with respect to FIGS. 2A and 2B. Other input devices (not shown) may include a microphone, joystick, game pad, satellite dish, scanner, or the like. These and other input devices are often connected to processing unit 21 through an input/output (I/O) interface 46 that is coupled to the system bus. The term I/O interface is intended to encompass each interface correspondingly used for a serial port, a parallel port, a game port, an infrared port, a radio frequency port, and/or a USB port (not separately shown). However, a primary focus of this disclosure is on the PS/2 keyboard interface, to which keyboard 40 will normally be coupled and with which it will communicate scan codes indicative of the movement of the wheel or slider on keyboard 40. Alternatively, keyboard 40 can be coupled to the USB port in the I/O interface, and in this case, will communicate USB-formatted data indicative of the movement of the wheel or slider.

A monitor 47 or other type of display device is also connected to system bus 23 via an appropriate interface, such as a video adapter 48, and is usable to display Web pages and/or other information. The wheel or slider on keyboard 40 can be used to control the position or other attributes of an object displayed on monitor, such as the scrolling of the content in a window (not shown) displayed on the monitor. In addition to the monitor, PCs are often coupled to other peripheral output devices (not shown), such as speakers (through a sound card or other audio interface—not shown) and printers.

PC 20 may operate in a networked environment using logical connections to one or more remote computers, such as a remote computer 49. Remote computer 49 may be another PC, a server (which is typically configured much like PC 20), a router, a network PC, a peer device, a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise-wide computer networks, intranets, and the Internet.

When used in a LAN networking environment, PC 20 is connected to LAN 51 through a network interface or adapter 53. When used in a WAN networking environment, PC 20 typically includes a modem 54 or other means for establishing communications over WAN 52, such as the Internet. Modem 54, which may be internal or external, is connected to system bus 23, or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Preferred Embodiments of Keyboard in Accord with the Present Invention

The following describes first and second preferred embodiments of the present invention. In the first embodiment of a keyboard 60 shown in FIG. 2A, unused PS/2 keyboard scan codes are used to indicate wheel movement. Keyboard 60 includes a plurality of typical keys 62 that enable a user to enter alpha-numeric characters and initiate functions. Keyboard 60 also includes an extension 64 across the front of the keyboard that serves as a user wrist support. Extension 64 also wraps around the left end of keyboard 60. A plurality of function buttons 66 and a wheel 68 are disposed in this portion of the extension to the left of keys 62, although it is also contemplated that the wheel can alternatively be disposed within the front portion of the extension, or that the extension can be provided on the right end of the keyboard, with the wheel and function buttons 66 then disposed to the right of keys 62. Other locations for the wheel and function buttons are also contemplated, depending upon the layout of keys 62. For example, in a split keyboard of the type sold by Microsoft Corporation as the NATURAL KEYBOARD™ (not shown), the wheel and function buttons could be disposed in the inverted "V-shaped" area between the two halves of the keyboard.

Wheel 68 is generally shaped like a cylinder or disk with friction enhancing grooves (not shown) or other high-friction surface enhancement provided around its outer circumference. The wheel rotates about a central axis 67 that is generally normal to the opposed sides of the wheel. While not shown in this drawing, it should be understood that mounted on an axis of the wheel and rotated by the wheel is a slotted encoder disk that includes a plurality of spaced-apart slots around its circumference. Also not shown are a pair of optical encoders that produce signals in which a change of state occurs as the slots pass between a light source and a light sensor comprising the optical encoder. Details of an optical encoder of this type as used on a mouse are disclosed in commonly assigned U.S. patent application Ser. No. 09/451,476, filed Nov. 30, 1999, entitled "Detented Optical Encoder," and Ser. No. 09/442,592, filed Nov. 17, 1999, entitled "Determining the Position of a Detented Optical Encoder," the specifications and drawings of both applications hereby being specifically incorporated herein by reference. Alternatively, the wheel itself can be provided with slots or with another alternating characteristic, such as "wagon-wheel" spokes. Also, other types of encoders could be used, such as electromechanical encoders. Since the techniques for producing signals indicating the rotation of a mouse wheel are essentially identical to that required to indicate the rotation of wheel 68, these details need not specifically be repeated herein.

Figure 2B:
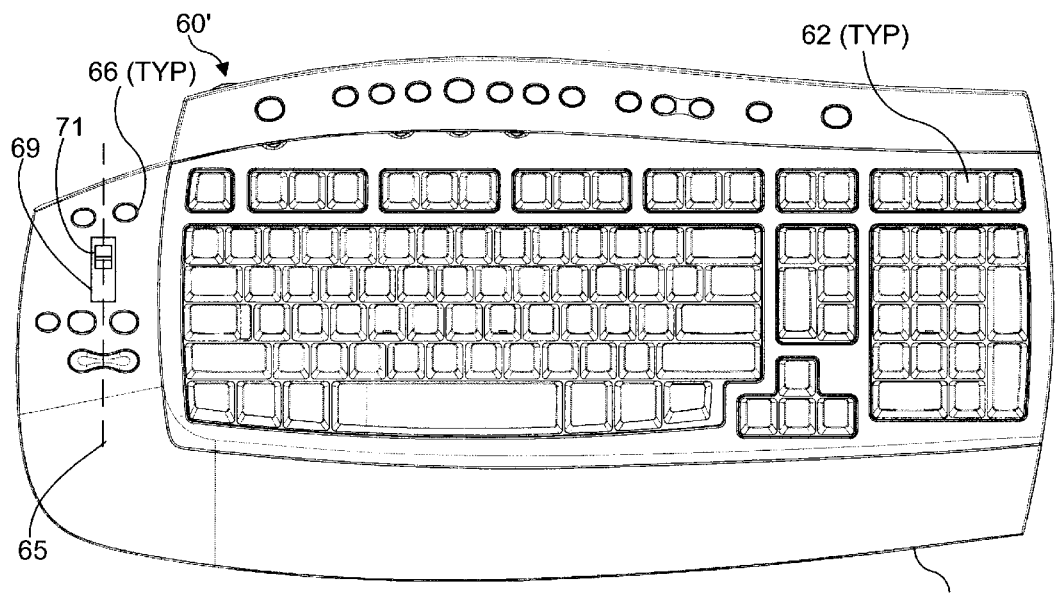

Alternatively, a keyboard 60', which is shown in FIG. 2B, may be provided. In this embodiment, a linear slider 71 that slides within a track 69 is included in place of wheel 68 to enable a user to input movement that produces a signal for input to a host computing device, such as PC 20. It should be noted that linear slider 71 can also be included on keyboard 60, in addition to wheel 68. As shown in FIG. 2B, linear slider 71 is disposed on the left side of keys 62 and moves along a central longitudinal axis 65 of track 69. Movement of slider 71 may be used to scroll a display or change an object on the monitor, in the same fashion as wheel 68. Those skilled in the art will recognize that other types of movable elements may be incorporated into the keyboard to produce an output signal from the keyboard that is indicative of motion of the movable element.

The direction of wheel or slider movement and the corresponding state changes that determine an extent of the movement are determined to enable a signal to be produced by the keyboard for input to the host computing device. Using an optical encoder, each state change in the signal produced by the optical encoder can be processed to determine the extent of motion. Also, by monitoring the movement of the wheel or slider with a pair of optical encoders, it is possible to determine the direction of movement based upon the relative timing of state changes monitored by the pair of optical encoders. Again, these details are discussed at length in the above-referenced patent applications that are incorporated herein by reference. In one embodiment of the present invention, state changes are counted to determine movement of the wheel or slider. The count may be equal to, proportional to, or another function of the number of the state changes (e.g., one could determine that each count would correspond to four state changes). However, in the following discussion, it will be assumed that there is one state change per count. In another embodiment, the speed of rotation or of the slider movement is determined based upon the elapsed time between successive state changes.

In either embodiment used to monitor the movement of the wheel or slider, the count may be positive or negative, depending on the direction of movement. For the sake of simplifying this explanation, the following discussion will be directed to keyboard 60 and will be directed to monitoring the rotation of wheel 68. However, it will be understood that these techniques are equally applicable to the linear motion of slider 71. The direction of wheel rotation is arbitrarily defined as positive for clockwise rotation (away from the user) and negative for counter-clockwise rotation of the wheel. The actual definition of positive or negative that is used is not pertinent as long as it is consistently applied. Based upon the count of state changes and direction of rotation of the wheel, a corresponding scan code or USB signal is transmitted to the host computing device, which processes the scan code or USB signal to determine the wheel movement and direction of rotation. The host computing device can use the wheel movement to control or change almost any variable characteristic, such as location of a display object, volume of sound, etc. However, a preferred application will typically use the indication of wheel rotation and direction to control scrolling of the contents of a window that is being displayed, e.g., on the monitor of PC 20.

Rotational Speed or Multiple Speed Embodiment

The first preferred embodiment for indicating movement of the wheel in the present invention estimates the number of state changes per second based on measuring the elapsed time between the last count and the next count. Preferably, processing is accomplished one state change at a time (either by sending the scan code or USB output signal before the next state change occurs or by buffering a stream of scan codes for successive state changes). Thus, only one state change would occur to enable the scan code or USB-formatted signal to be output. The number of state changes per second or rotational rate of the wheel is inferred as the inverse of the elapsed time between state changes. However, this embodiment could be modified to process multiple state changes in determining the scan code or USB signal. One contemplated modification would be to divide the number of state changes by the elapsed time for that number of state changes to be accumulated, to determine the rotational velocity. Alternatively, the keyboard and host could be synchronized to expect a higher number of state changes per reading of the elapsed time.

Figure 3:
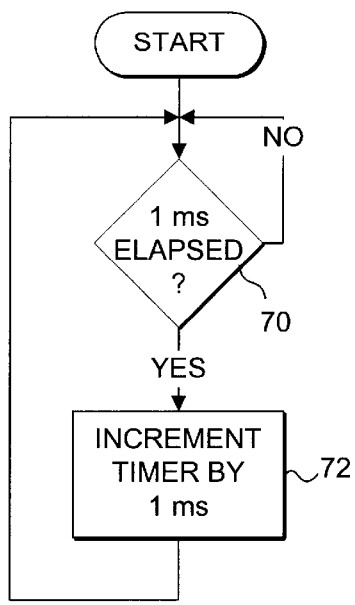
FIG. 3 is a flow diagram illustrating the logical steps used by a timer that operates as a background process for measuring the elapsed time between successive state changes of the wheel or slider.

In any case, a timer having a 1 millisecond resolution is used in this embodiment to measure the elapsed time between successive state changes. FIG. 3 is a flow diagram showing the logic implemented by a timer, which operates as a background process, for measuring the elapsed time between successive state changes of the wheel. At a decision block 70, the timer determines whether 1 millisecond of time has elapsed. Preferably, the timer utilizes a conventional system clock or oscillator (not shown) that is disposed in the keyboard to determine the 1 millisecond increments. The timer loops until a 1 millisecond interval has elapsed. Once 1 millisecond has elapsed, the timer is incremented by 1 millisecond at a block 72, and then returns to the beginning of the process to loop until another millisecond has elapsed. The total time in milliseconds is thus incremented until the timing process is reset, as explained below. Alternatively, a timer could determine an elapsed time by counting clock cycles, or the number of instructions processed, or by using other timing techniques.

Figure 4:
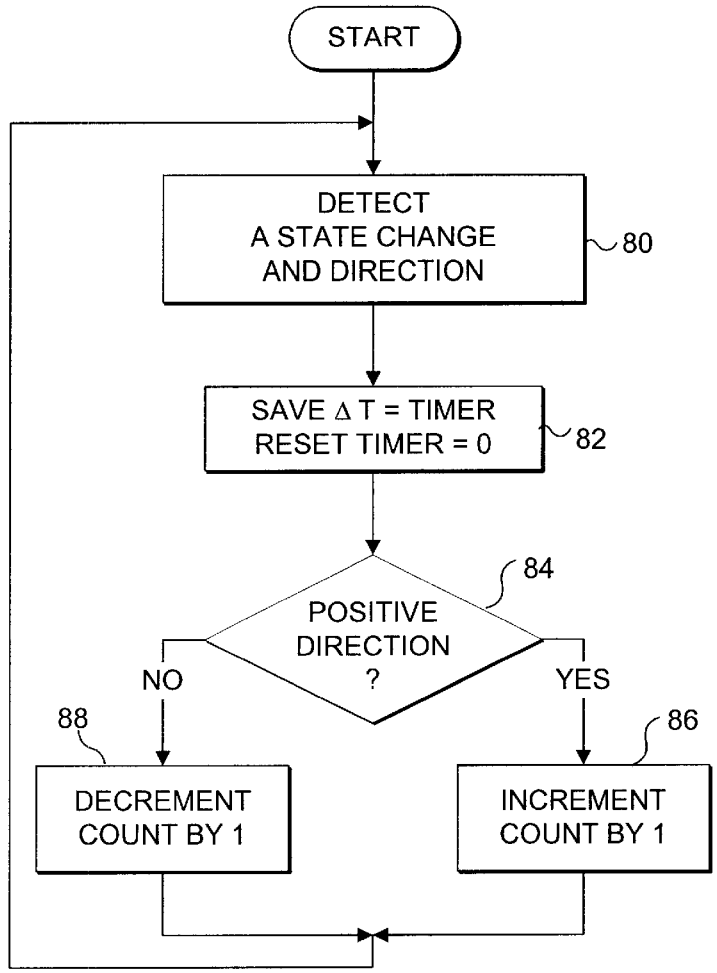
FIG. 4 is a flow diagram illustrating the logic employed to determine a total count of state changes.

FIG. 4 is a flow diagram of another background process that saves the elapsed time between state changes of the wheel accumulated in FIG. 3 and accumulates the number of counts of the wheel, taking into consideration the direction of rotation of the wheel that is detected. Again, the absolute value of accumulated counts will preferably never be more than one. Effectively, the summation will just toggle between zero and one or minus one. Alternatively, the total number of state changes per second or count could be calculated from the elapsed time for an arbitrary number of counts or state changes. However, calculating the total number of state changes per second is unnecessary, since the elapsed time between successive state changes can be used directly to select a scan code or USB signal value for transmission to the host computing device.

Because the count represents the state change and has a positive or negative sign, the count also indicates the direction of the state change. As described above, the sign of the wheel rotation direction is detected at a block 80 when a state change is detected. When a wheel state change and direction are detected, the elapsed time accumulated by the timer is saved as a ΔT at a block 82. The timer is also reset to zero so that the timer can measure the elapsed time until the next state change or count occurs. As suggested above, ΔT may instead be saved after a multiple number of state changes has been detected. The time between successive state changes may then be calculated by dividing the total elapsed time for that count by the number of state changes or count accumulated. Preferably, the keyboard processor should be sufficiently fast to fully process the elapsed time and transmit a scan code or USB signal before the next state change occurs.

At a decision block 84, the wheel rotation direction is determined from the detected sign. If the state change direction of the wheel is positive, the count is increased by one at a block 86. Conversely, if the direction is negative, the count is decreased by one at a block 88.

Figure 5:
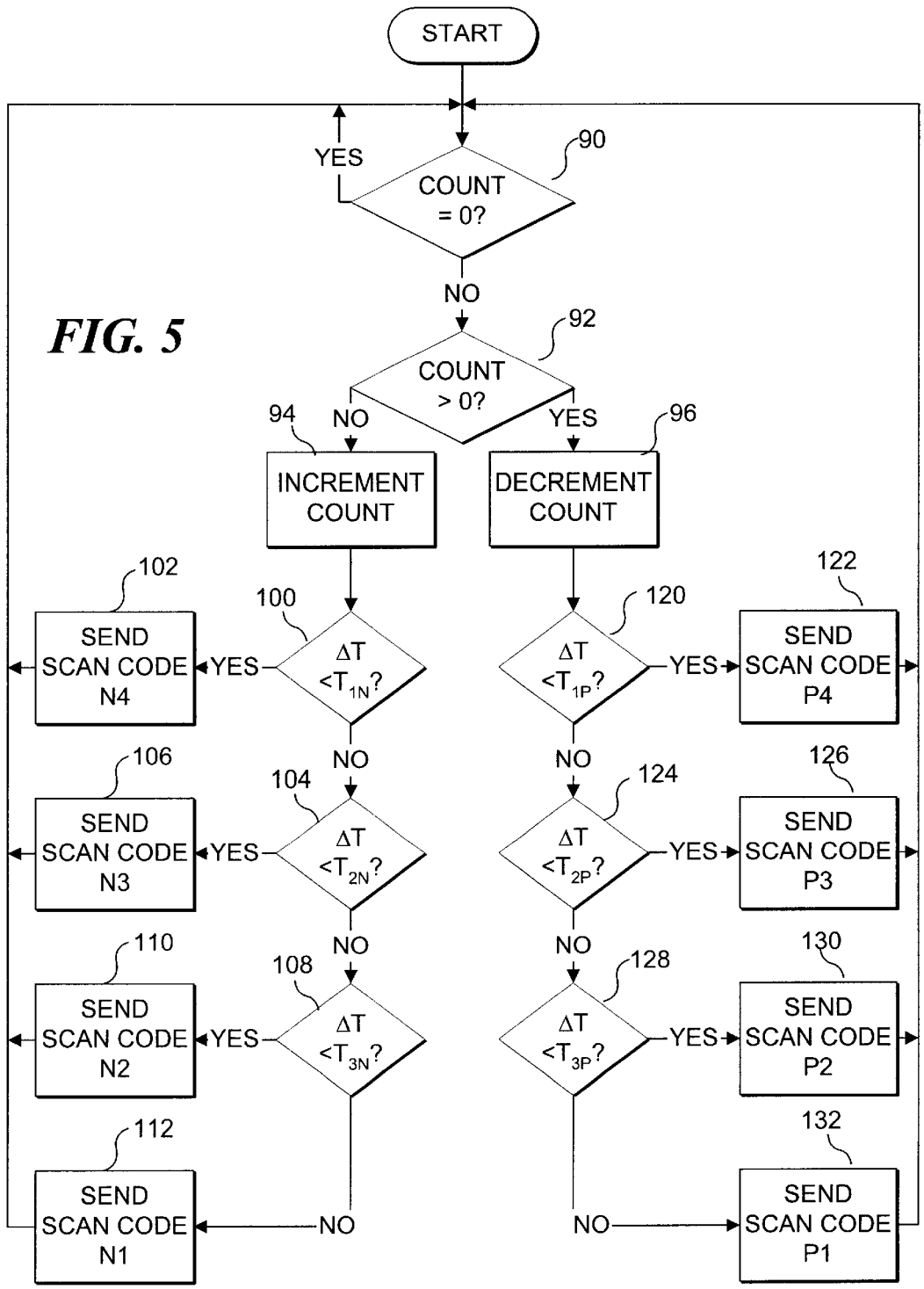
FIG. 5 is a flow diagram illustrating the logic employed to select a keyboard scan code as a function of an elapsed time between state changes of a wheel or slider.

FIG. 5 is a flow diagram of the logic employed to select a PS/2 keyboard scan code as a function of the elapsed time (and optionally, the count). A decision block 90 loops, waiting for the count to change to a nonzero value (i.e., to +1 or −1), which occurs when the background logic shown in FIG. 4 detects a state change. Once the count changes, a decision block 92 determines the direction of the wheel motion based on the sign of the count. As suggested above, this embodiment attempts to drive the count back to zero until all counts are processed. Thus, if the count is currently negative, the count is incremented by one at a block 94 to drive the count more positive and back toward zero. Conversely, if the count is positive, the count is decremented at a block 96 to drive the count more negative and back toward zero.

In this embodiment, within each set of scan codes, four scan codes are designated for communicating positive rotation and four scan codes are designated for communicating negative rotation of the wheel. Within both sets, each of the four scan codes represents a different speed code indicative of a range of rotational speeds of the wheel. Thus, each of the eight scan codes indicates a unique direction and speed range. FIG. 6A is a table showing the preferred scan codes and corresponding speed codes 1–4. For historical reasons, the keyboard and the operating system of the host computing device typically use different sets of scan codes. The keyboard normally uses Scan Code Set 2 and reports these scan codes to the host. A host keyboard controller then typically converts the reported scan codes to Scan Code Set 1 scan codes for use by the operating system. However, as a minor variation, the keyboard of this preferred embodiment uses Scan Code Set 1 codes to report negative rotations to the host. Directly reporting Scan Code Set 1 codes for negative rotations, rather than relying on the usual host translation, avoids a 1-byte penalty (i.e., a 50% penalty) in packet rate processing for negative movement. In any case, the actual scan codes used by the keyboard to represent a speed range for the wheel are irrelevant, as long as they are unique, and are not already used for the keys on a standard keyboard. For example, the particular scan codes listed in FIG. 6A were selected to minimize interference with scan codes that do not have a 0xE0 prefix byte, thereby ensuring that in the event a computer or application ignores the 0xE0 prefix byte, a wheel scan code itself does not unintentionally map to one of the standard alphanumeric keys. Alternatively, a device driver can be written that will protect against conflicts.

Also, the table in FIG. 6A lists "make" and "break" codes. Conventional keys have "make" and "break" codes associated with them. These correspond to closing a switch contact when a key is depressed and opening the switch contact when the key is released, respectively. This embodiment uses four "make" codes to represent positive rotation and uses the corresponding four "break" codes to represent negative rotation. Specifically, to obtain the packet rate efficiency described above, the keyboard of this particular embodiment sends four Scan Code Set 2 "make" codes (that are translated by the host), and four Scan Code Set 1 "break" codes (that the host recognizes as not needing translation).

As an alternative, eight separate "make" codes could be used, with four codes representing positive rotation and the remaining four representing negative rotation. As another alternative, greater speed band resolution can be provided by using eight "make" codes to represent eight different speeds in one direction, and utilizing the corresponding "break" codes to represent eight different speeds in the other direction, for a total of sixteen scan codes instead of just the eight "make" and "break" codes listed. As yet another alternative, the original four-speed resolution could be implemented with eight "make" codes, and a second statechange magnitude could be represented by the corresponding eight "break" codes. For example, the eight "make" codes could represent one state change per the elapsed time period, whereas the corresponding eight "break" codes could represent two state changes per the elapsed time period. This arrangement may be useful if state changes occur faster than a keyboard processor can handle producing the appropriate scan codes. Those skilled in the art will recognize that a number of other variations using available scan codes are also possible.

Preferably, each speed code corresponds to a different range of counts or state changes per second, determined from the elapsed time between successive state changes. FIG. 6B is a table listing speed ranges (in counts per second) and corresponding ranges of elapsed time for each speed code. In accord with this table, the stored elapsed time that was determined is compared with the predefined threshold values listed and with the direction of rotation to select the appropriate scan code (or USB signal) to transmit to the host computing device.

As shown in FIG. 5, for example, assuming a negative direction of rotation detected, the stored elapsed time, $\Delta T$ (from FIG. 4), is compared with a first threshold time value, $T_{1N}$ at a decision block 100. Threshold $T_{1N}$ represents a relatively short time interval, such as eighteen milliseconds (18 ms). Thus, if the elapsed time $\Delta T$ is less than the small threshold $T_{1N}$, a scan code N4 is sent to the host computing device at a block 102, where N4 represents an inferred wheel speed of at least fifty-five state changes per second (i.e., 1 count per 18 ms yields approximately 55 counts per second).

If $\Delta T$ is greater than $T_{1N}$, the elapsed time is compared with a second threshold time value, $T_{2N}$, at a decision block 104. Threshold $T_{2N}$ represents a slightly longer time interval, such as thirty-six milliseconds (36 ms). If the elapsed time $\Delta T$ is larger than threshold $T_{1N}$, but less than the threshold $T_{2N}$, a scan code N3 is sent to the host computing device at a block 106, and this scan code represents an inferred slower wheel rotational speed of between twenty-seven and fifty-five state changes per second (i.e., 1 count per 36 msyields approximately 27 counts per second).

Similarly, if $\Delta T$ is greater than $T_{2N}$, the elapsed time is compared with a third threshold time value, $T_{3N}$, at a decision block 108. Threshold $T_{3N}$ represents an even longer time interval, such as sixty milliseconds (60 ms). Thus, if the elapsed time $\Delta T$ is larger than threshold $T_{2N}$, but less than threshold $T_{3N}$, a scan code N2 is sent to the host computing device at a block 10, where scan code N2 represents an inferred slower wheel rotational speed of between sixteen and twenty-seven state changes per second (i.e., 1 count per 60 msyields approximately sixteen counts per second).

Lastly, if $\Delta T$ is greater than $T_{3N}$, a scan code N1 is transmitted to the host computing device at a block 112, where N1 indicates an inferred slowest wheel speed of less than sixteen state changes per second (i.e., less than 16 counts per second). The whole process is repeated for each count (either before the next wheel count occurs or by buffering a stream of scan codes) until the count is again zero.

A similar selection process is accomplished when a positive rotation is detected, proceeding from block 120 through block 132. However, the threshold values are preferably different for the positive direction of wheel rotation than for the negative direction. Empirical usability studies indicate that users are more efficient at rotating the wheel toward themselves (e.g., toward the palm of their hand with a finger) and tend to rotate the wheel faster in that direction than they are at rotating the wheel away from themselves (e.g., away from their palm). Correspondingly, different threshold values are preferably employed for rotation of the wheel toward the user than for rotation away from the user. As a result, the positive scan codes may cause the host computing device to scroll the display at different rates than the negative scan codes. Preferably, however, use of unequal threshold values (relative to direction of wheel rotation) compensate for a user's unequal finger speed in order to approximately equalize the resulting scroll rate in each direction.

Because the scan codes represent an inferred rotation speed of the wheel, the host computing device can use this information to derive an estimated acceleration. For example, the relationship of each speed code to the distance through which the contents of a window are scrolled on the screen of the monitor can be nonlinear. The host computing device can provide a sense of acceleration in the scrolling action, making the scrolling rate a non-linear function of the speed with which the wheel is rotated, in addition to scrolling based upon how far the wheel is rotated. Although one scan code is sent per one wheel count reading, the magnitude of the resulting scroll command need not be linear. As indicated above, the particular scan code sent represents a speed code, which represents an approximate number of state change counts per second. The host computing device can reflect the number of counts per second in the magnitude of the scroll command or in other uses of the wheel input data that is received from the keyboard. For example, the host computing device may scale the scroll command by an additive factor, by a multiplying factor, by an exponential factor, or by some complex function applied to the speed code received from the keyboard. Thus, a fast (but short) wheel movement might result in a large scroll distance, although only a single state change count was detected.

Multiple Count Embodiment

The second embodiment for monitoring movement of the wheel is referred to as the multiple count embodiment. Instead of inferring a wheel rotational speed based on elapsed time between changes in state or counts, this second embodiment infers a rotational distance, or magnitude by accumulating a running total count of state changes.

Figure 7:
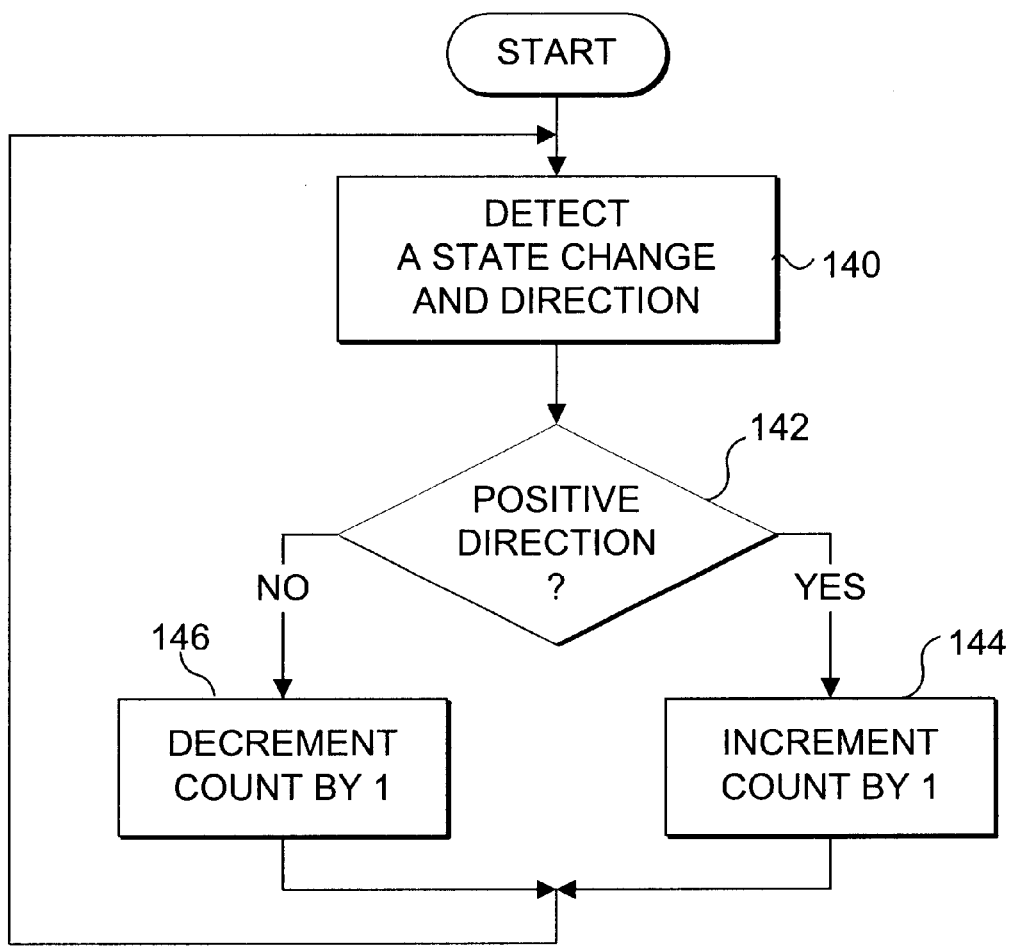
FIG. 7 is a flow diagram of the logic implemented by a counter that detects a number of state changes as the wheel or slider is moved and updates a count of the number of state changes.

FIG. 7 is a flow chart showing the logic implemented by a counter that accumulates a running total wheel count of state changes. At a block 140, a state change and direction of wheel movement is detected. A decision block 142 determines the direction in which the wheel was rotated. If the wheel was rotated in a positive direction, the running total wheel count is incremented by one at a block 144. Conversely, if the wheel was rotated in a negative direction, the running total wheel count is decremented by one at a block 146. State changes are accumulated by this running total wheel count over a period of time, rather than by being processed one state change at a time.

Figure 8:
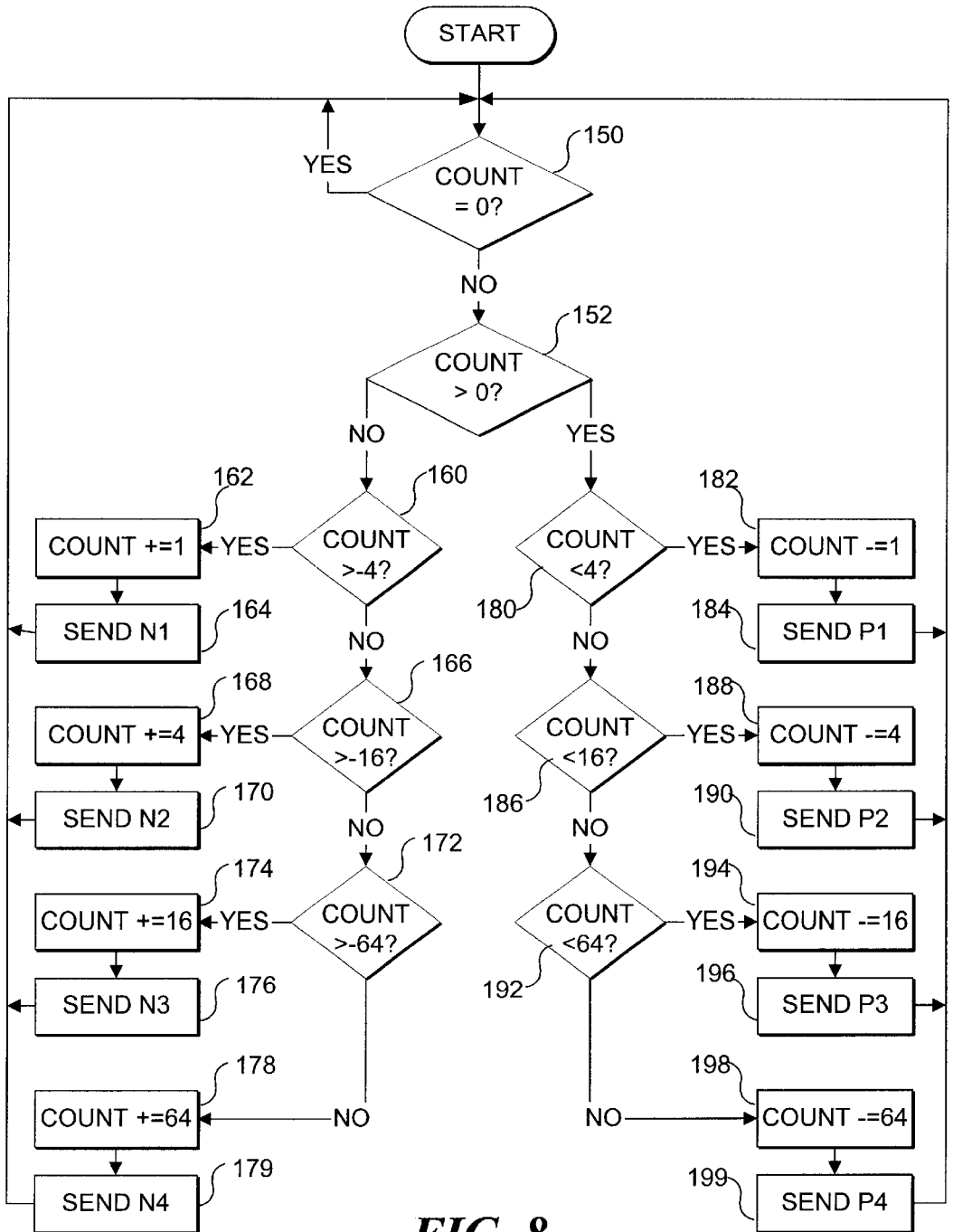
FIG. 8 is a flow diagram of the logic employed to select a keyboard scan code as a function of a number of state changes of a wheel that are accumulated.

FIG. 8 is a flow diagram showing the logic implemented to select a PS/2 keyboard scan code or USB signal to transmit to the host computing device, as a function of the running total wheel count. At a decision block 150, a reading is taken of the current running total wheel count. If the count is zero, no wheel movement has occurred and the process simply loops until a non-zero count is detected. Unlike the multiple speed embodiment discussed above, the elapsed time between readings is not measured or saved. The entire process of selecting a scan code or appropriate USB data need not be completed before the next state change occurs. However, as described further below, an elapsed time or fixed time interval can be used with this embodiment to provide an acceleration on the host computing device.

Once a nonzero count is detected, the sign of the count is determined at a decision block 152, indicative of the direction of rotation for the wheel. If the sign of the count is negative, the magnitude of the count is driven back toward zero by determining a predefined threshold number that is closest to, but lesser in magnitude than, the count from among a plurality of different threshold numbers and adding that threshold number to the count. Conversely, if the sign of the count is positive, the magnitude of the count is driven back toward zero by determining a predefined threshold number that is closest to, but lesser in magnitude than, the count from among the plurality of threshold numbers and subtracting that threshold number from the count. The threshold numbers also determine the scan code or USB data signal that is selected and transmitted to the host computing device.

Figures 9, 10:
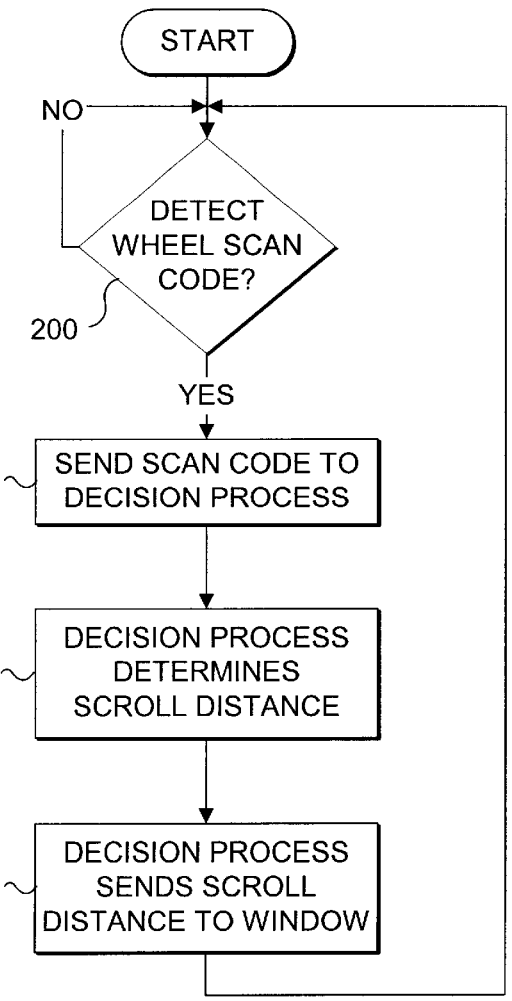
FIG. 9 is a table listing scan codes and corresponding count threshold numbers.
FIG. 10 is a flow diagram illustrating the logic implemented by a host computer to process a scan code received from the keyboard.

As with the first embodiment, four different scan codes are reserved for positive rotation and four different scan codes are reserved for negative rotation. However, in this embodiment, each of the four scan codes, within the positive and negative sets, is assigned to represent a threshold number, i.e., a range of accumulated threshold counts. For example, four scan codes are respectively assigned to represent the ranges of accumulated counts referenced by the threshold numbers of 1, 4, 16, and 64. FIG. 9 is a table of preferred scan codes and corresponding threshold numbers related to the positive and negative rotational directions of the wheel. The threshold numbers can be arbitrary, but those listed were chosen to minimize the number of bytes needed to report a threshold number to the host computing device, while also supporting a reasonably large count per report. Within this framework, this preferred embodiment selects the scan code assigned to represent the closest threshold number that is less than or equal to the current accumulated count.

For example, for a detected negative rotation of the wheel, the accumulated count is compared with a first threshold number of negative four (−4) at a block 160 in FIG. 8. If the count is greater than −4 (i.e., between −4 and 0), the count is driven toward zero by incrementing the count by one at a block 162, and a scan code N1 that is indicative of a count magnitude of one is transmitted to the host computing device at a block 164.

If the count is less than or equal to −4, the count is compared with a second threshold number of negative sixteen (−16) at a decision block 166. If the count is greater than −16 (i.e., between −16 and −4), the count is driven toward zero by incrementing the count by four at a block 168, and a scan code N2 representing a count magnitude of four is sent to the host computing device at a block 170.

Similarly, if the count is less than or equal to −16, the count is compared with a third threshold number of negative sixty-four (−64) at a decision block 172. If the count is greater than −64 (i.e., between −64 and −16), the count is driven toward zero by incrementing the count by sixteen at a block 174, and a scan code N3 representing a count magnitude of sixteen is sent to the host at a block 176.

Lastly, if the count is equal to or less than −64, the count is driven toward zero by incrementing it by sixty-four at a block 178, and a scan code indicative of a count magnitude of sixty-four is sent to the host at a block 179.

A similar selection process is accomplished if the wheel was rotated in a positive direction, by following blocks 180 through 199. As with the previous embodiment, the threshold numbers may be different for positive wheel rotation than for negative wheel rotation. In these blocks, as one of the scan codes P1–P4 is selected, the count is driven toward zero by decrementing the count by the corresponding threshold count value.

In its simplest form, this embodiment does not provide any sense of acceleration, because the resulting scroll command represents the count magnitude, which does not consider the rate at which the count was accumulated. However, as suggested above, the multiple count embodiment may be modified to provide a sense of speed or acceleration if the host computing device polls the keyboard to obtain scan code reports at defined time intervals, rather than having the keyboard send the scan code whenever it is ready.

Alternatively, the host computing device may time-stamp the scan code reports as they are received, so that the elapsed time between reports is known. In either case, the host computing device can monitor the number of state changes or counts occurring during a known time interval to provide a sense of acceleration, as described in the first embodiment above.

Host Processing

FIG. 10 illustrates the logic that a host computing device uses to process a wheel scan code. A keyboard controller in the host computing device detects the scan code reported from the keyboard, and converts the scan code from a Scan Code Set 1 to a Scan Code Set 2. Generally, the keyboard controller then provides the scan code to the operating system. Preferably, however, for wheel scan codes, a filter driver or a low level keyboard hook will be provided to intercept the converted scan codes for the wheel, and will then process them instead of the operating system. In a preferred embodiment implemented in a Microsoft Corporation WINDOWS™ operating system in connection with using the wheel for scrolling the contents of a window, the filter driver or hook monitors the incoming stream of scan codes at a decision block 200. So long as conventional keystroke scan codes are received, the logic loops, so that the operating system processes the scan codes in its normal fashion. However, when a wheel scan code reaches the host computing device, the driver or hook invokes a WINDOWS™ application program interface (API) (e.g., SendMessage, PostMessage, SendInput) at a block 202, which sends a message to a scroll decision process (or other activity unrelated to scrolling, depending upon the use to which the wheel is being applied), and includes the scan code as a message argument. The scroll decision process interprets the intercepted wheel scan code at a block 204 to determine an appropriate scroll distance to apply in scrolling the contents of a window. Further details regarding this determination are discussed below with respect to FIG. 11. Once the scroll distance is determined, the scroll decision process invokes a WINDOWS™ API at a block 206 of FIG. 10 to send the scroll distance in a message to the appropriate window. This message includes a message argument identifying the message as a mouse-wheel command (e.g., WM_MOUSEWHEEL). The receiving window is most likely the window with the current focus (normally the foreground window), but can also be the window under the pointer, or any other window, depending upon other aspects of the application program executed on the host computing device, to which the present invention is applied.

Figure 11:
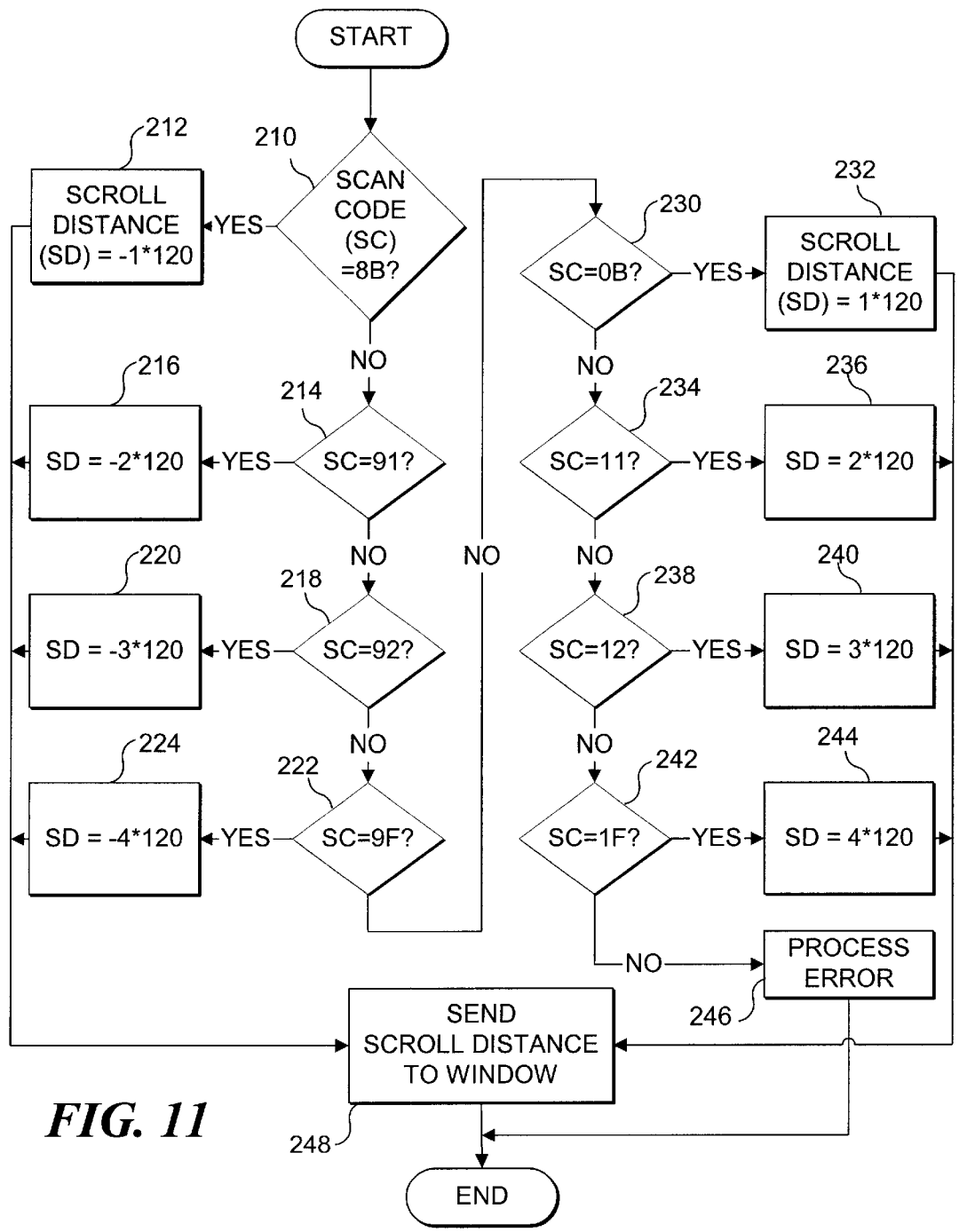
FIG. 11 is a flow diagram illustrating the logic implemented by the host to determine an appropriate scroll distance based on a scan code received from the keyboard.

FIG. 11 illustrates preferred logic used by the host computing device in the scroll decision process employed to interpret a scan code and determine an appropriate scroll distance. The logic is essentially that of a selectable switch statement, wherein the scroll decision process compares a numerical value of the scan code received from the keyboard (and converted if necessary) with expected values to determine arguments and to determine the scroll distance. In the Figures, the scan codes are represented by hexadecimal numbers. For example, in the multiple speed method, the scroll decision process determines the speed code value and wheel direction sign represented by the scan code, and executes a scroll distance calculation using these arguments.

Specifically, at a decision block 210, a low byte of the scan code is compared with an expected hexadecimal scan code value of 71. If the values compared are equal, the scroll decision process knows that the scan code represents a speed code value of one (1) for a negative rotation direction: The scroll decision process then multiplies the speed value and sign by a constant (120) at a block 212. The constant preferably represents one scrolling event, such as scrolling a default number of lines of text in a window, as defined in a system registry key. However, the constant may change for various alternative uses of the wheel (e.g., to control zooming, throttling, etc.). In this instance, negative one (−1) is multiplied by the constant 120, which is pre-assigned in this example, to correspond to scrolling the contents of a window by three single-spaced lines of text. The constant that is chosen can be selected to provide a desired resolution of scrolling. For example, if the desired scroll resolution is one line of text, the constant might simply be changed to 40. Also, as suggested above, the process can be adapted for state changes other than one, as long as the keyboard and host both know the value. For state changes other than one, the number of state changes is also multiplied in the calculation to obtain the scroll value desired.

If the scan code does not match the expected value of block 210, the low byte of the scan code is compared with an expected hexadecimal value of 72 at a decision block 214. If the values are equal in this comparison, the scroll decision process knows that the scan code represents a speed code value of two (2) for a negative rotation of the wheel. The scroll decision process then multiplies the speed value and sign by the selected constant at a block 216. In this case, negative two (−2) is multiplied by the constant 120 to produce the resulting scroll distance that will be applied to the contents of the corresponding window.

The constant and function applied may also be varied for each scan code in the sequence. For example, to provide a sense of acceleration, an exponential function may be applied to the speed code, so that the scroll distance ramps up or down. Thus, instead of simply scrolling the entire distance that a scan code represents in one step, the distance that a scan code represents can be scrolled in an increasing or decreasing manner. Preferably, however a sense of acceleration is provided with less computational processing by a change in scroll distance between different successive scan codes. For example, a scan code representing a speed code two (2), followed by a scan code representing a speed code four (4) will scroll six (6) lines of text, followed by twelve (12) lines of text. This jump in distance provides a sense of acceleration. Those skilled in the art will recognize that the sense of acceleration can be magnified, or otherwise modified, in other ways, such as by applying a modification other than a simple constant multiplier.

The process continues in the same fashion for blocks 218 through 244. If the scan code does not match any of the expected values, an error is processed at a block 246, and no scrolling will occur. Once the scroll distance is determined, the scroll decision process invokes an API to send the scroll distance that was thus determined to the appropriate window at a block 248. For the multiple count method, the host carries out the same process, except that an accumulated number of state changes is used in the calculation instead of the speed code.

USB Embodiment

The present invention may also employ the USB protocol to convey information concerning the movement of the wheel, slider, or other movable element. Preferably, one of a limited set of reports based on a Human Input Device (HID) class report descriptor is transmitted to the host computing device. The limited set of reports indicate wheel speed and direction, or accumulated counts and direction, and thus convey the same information as PS/2 keyboard scan codes do in the preceding discussion. The USB protocol could be used to directly provide numerical data, such as the elapsed time between state changes, velocity of the wheel, or number of state changes. The host could then select and process the appropriate code that is analogous to the PS/2 scan code. Preferably, however, the USB protocol is used to transmit only the limited reports that represent a speed code or threshold number, just as was done for the scan codes. As a result, a keyboard with a wheel that communicates with the host computing device is able to use the same logic as a keyboard with a wheel that communicates through a PS/2 keyboard port, except that coded USB reports are sent to the USB port on the host computing device, instead of PS/2 scan codes being sent to the PS/2 keyboard port.

Figure 12:
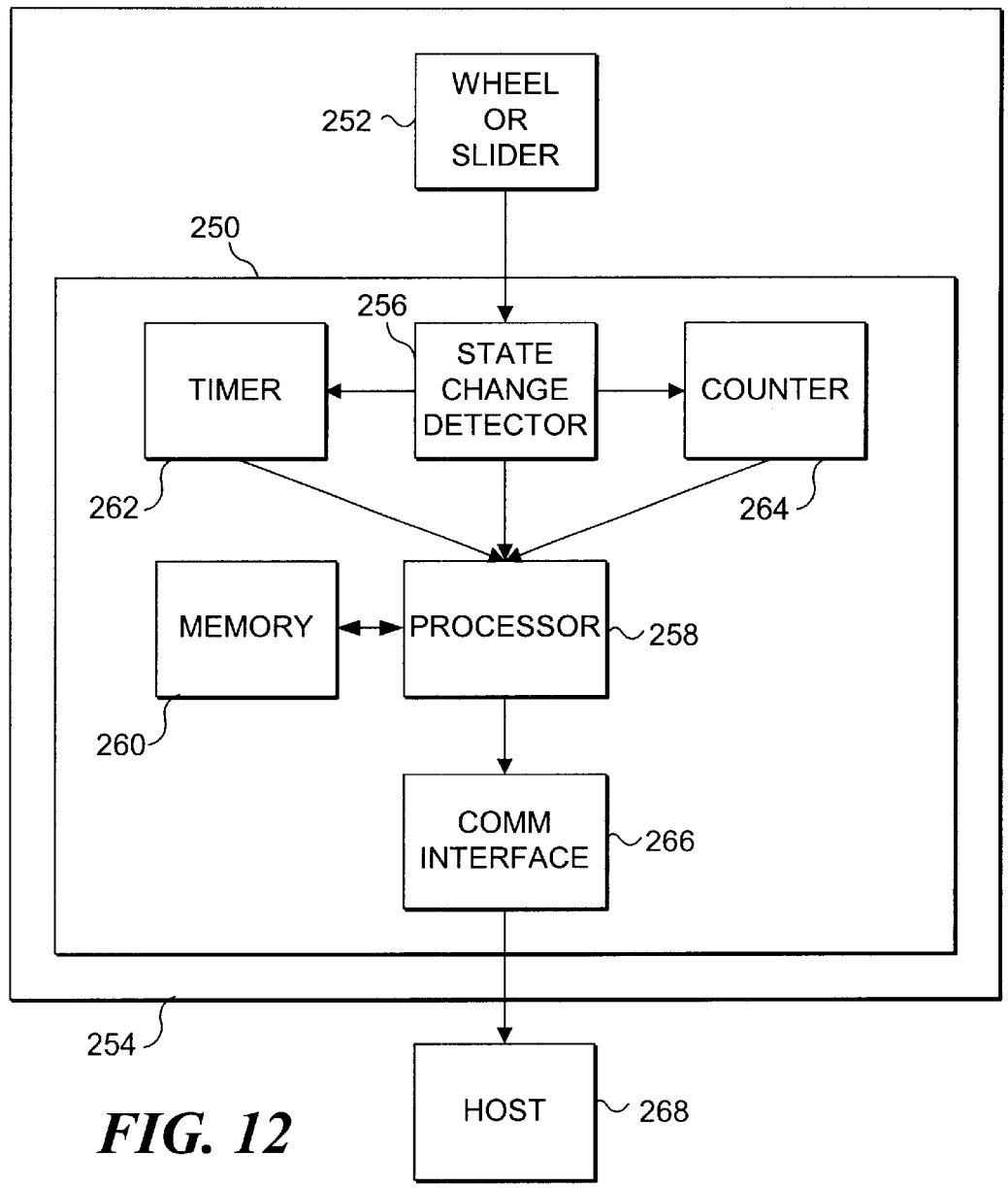
FIG. 12 is a functional block diagram of the keyboard, which is coupled to a host computing device.

For example, the speed data determined in the multiple speed embodiment can be represented with a USB report by defining a 2-bit field containing the state change count (i.e., magnitude) and a 2-bit field containing the speed code. As with the PS/2 keyboard scan code embodiment, the bits representing the state change count will preferably be limited to the range −1 to +1, where the first bit is a sign bit reflecting wheel direction and the second bit is a magnitude bit reflecting a state change. Similarly, the bits representing the speed code will be limited to the range 0–3, corresponding to speed codes of 1–4. Thus, an example report representing a state change count of positive one and a speed code of three would have a binary value of 0111. A fragment of a HID class report descriptor (i.e., the formatting of the reports) that might be employed to implement the USB multiple speed embodiment for communicating this type of data to a host computing device is as follows:

COLLECTION (Logical)
    USAGE_PAGE (Generic Desktop)
    USAGE (Wheel)
    LOGICAL_MINIMUM (−1)
    LOGICAL_MAXIMUM (+1)
    REPORT_COUNT (1)
    REPORT_SIZE (2)
    INPUT (Variable, Relative)
    USAGE (Vz)
    LOGICAL_MINIMUM (0)
    LOGICAL_MAXIMUM (3)
    INPUT (Absolute)
    END_COLLECTION Similarly, the multiple count embodiment for conveying the count threshold to a host computing device with a USB report can be implemented by defining an 8-bit field containing the sign and magnitude of the threshold number in two's complement. Here, the high bit is a sign bit and the following seven bits accommodate a threshold number magnitude of 64. Thus, an example report representing a state change count of negative 23 would have a threshold number of −16, resulting in a two's complement value of 11110000 (Hexadecimal F0). A fragment of a HID class report descriptor (i.e., the formatting of the reports) that might be used to implement the USB multiple count embodiment is as follows:

COLLECTION (Logical)
    USAGE_PAGE (Generic Desktop)
    USAGE (Wheel)
    LOGICAL_MINIMUM (−128)
    LOGICAL_MAXIMUM (+127)
    REPORT_COUNT (1)
    REPORT_SIZE (8)
    INPUT (Variable, Relative)
    END_COLLECTION Functional Keyboard Component System FIG. 12 illustrates a system 250 employed in a keyboard 254 for monitoring and indicating movement of a wheel or slider 252. For example purposes, we refer simply to a wheel 252. The movement of the wheel is represented by a PS/2 keyboard scan code as a function of a state change detected as wheel 252 rotates. The system includes a state change detector 256 operatively connected to wheel 252 that senses a direction and angular displacement of the wheel. This detector may be a typical encoder that utilizes an LED and photo transistors to detect incremental rotation of an encoder disk that is connected to wheel 252 and has a plurality of alternating slots and tabs, as described in the two patent applications incorporated by reference hereinabove. In its simplest form, the present invention could use just the sign of the wheel direction and a single state change reflecting one count of displacement of one encoder disk tab. With this information, a processor 258 in communication with state change detector 256 selects a scan code representing the single state change in the detected direction as described above. Processor 258 is preferably a micro-controller, such as a CYPRESS micro-controller, Model CY7C63413-PV that operates at approximately 6 MHz. Processor 258 makes the scan code selection by executing machine instructions stored in a memory 260 that is in communication with the processor. Memory 260 includes ROM or erasable programmable read only memory (EPROM), and RAM. In addition to the machine instructions, a plurality of scan codes from which processor 258 can select are also stored in memory 260.

For enabling the host computing device to determine a sense of acceleration, processor 258 can execute machine instructions corresponding to the multiple speed embodiment described above, in which an elapsed time between state changes is determined by a timer 262 that is in communication with processor 258 and state change detector 256. Timer 262 may be any commercially available timer that is compatible with processor 258. Alternatively, the processor can execute machine instructions that enable it to determine the elapsed time between successive state changes.

When implementing the multiple count embodiment described above, processor 258 executes machine instructions that cause it to accumulate a running total count of state changes with a counter 264 that is in communication with processor 258 and state change detector 256. Counter 264 may be any commercially available counter circuit that is compatible with processor 258, or the counting function may be implemented by the processor.

System 250 also includes a communication interface 266 between processor 258 and a host computing device 268, to convey the output signal that includes the selected scan code. Communication interface 266 may automatically detect whether to use the PS/2 keyboard scan code protocol, or the USB protocol, as described above, when the keyboard is connected to the host computing device.

Although the present invention has been described in connection with the preferred form of practicing it and modifications thereto, those of ordinary skill in the art will understand that many additional modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method of conveying a signal indicative of movement of a movable element with respect to a single axis, said movable element being disposed on an input device that is operatively coupled to a host computing device through a keyboard interface that communicates using a keyboard communication protocol, which does not explicitly provide for communicating movement of the movable element, comprising the steps of:
   (a) detecting a state change caused by movement of the movable element with respect to the single axis, wherein the movable element is not limited to only motion between two end states relative to the single axis;
   (b) selecting a predefined code as a function of the state change to represent the movement of the movable element, wherein the predefined code conforms to the keyboard communication protocol and the predefined code is not explicitly provided in the keyboard communication protocol for communicating movement of the movable element; and
   (c) transmitting a signal that includes the predefined code to the host computing device and is in conformance with the keyboard communication protocol.

2. The method of claim 1, wherein the movable element is a wheel that is rotatable about an axis of rotation, said axis of rotation comprising said single axis.

3. The method of claim 1, wherein the movable element is a slider that is slidable along the single axis.

4. The method of claim 1, wherein the state change indicates a displacement and direction of movement of the movable element.

5. The method of claim 1, wherein the predefined code is a keyboard scan code.

6. The method of claim 5, wherein the step of transmitting the predefined code comprises the step of transmitting the keyboard scan code to a keyboard port of the host computing device.

7. The method of claim 1, wherein the predefined code is in a Universal Serial Bus (USB) format that is conveyed to a USB port on the host computing device, said predefined code indicating a range of movement of the movable element.

8. The method of claim 1, wherein the predefined code represents a rotational wheel speed and direction.

9. The method of claim 1, wherein predefined code indicates one of:
   (a) an elapsed time between state changes; and
   (b) a number of state changes that has been accumulated.

10. The method of claim 9, wherein the step of detecting comprises the step of starting to measure the elapsed time between changes of state of the movable element when a state change is detected.

11. The method of claim 10, wherein the step of selecting comprises the steps of:
   (a) comparing the elapsed time to a plurality of threshold times, each of which corresponds to a different speed range of the movable element; and
   (b) selecting the predefined code that is indicative of a speed range of the movable element determined by the step of comparing.

12. The method of claim 10, wherein the step of selecting comprises the steps of:
   (a) determining a direction of movement of the movable element; and
   (b) selecting the predefined code as a function of the direction of movement of the movable element.

13. The method of claim 1, wherein the predefined code represents a number of state changes accumulated since a previous number of accumulated state changes was transmitted to the host computing device.

14. The method of claim 13, wherein the step of selecting comprises the steps of:
   (a) comparing the number of state changes accumulated to a plurality of threshold numbers; and
   (b) selecting a predefined code as a function of a threshold number determined by the step of comparing.

15. The method of claim 14, further comprising the steps of:
   (a) reducing the number of state changes accumulated by the threshold number that was determined; and
   (b) repeating steps of comparing, selecting, and reducing until a residual count remaining after the step of reducing is less than a predetermined minimum.

16. The method of claim 1, further comprising the step of providing machine instructions that are executed by the host computing device for determining a change of an object on a display of the host computing device as a function of the predefined code that is transmitted.

17. The method of claim 16, wherein the object comprises a content of a window that is scrolled in response to the predefined code.

18. The method of claim 16, wherein the object is moved on the display in a direction and by an amount in response to the predefined code.

19. The method of claim 1, wherein successive predefined codes transmitted to the host computing device are indicative of an acceleration of the movable element.

20. The method of claim 19, further comprising the step of changing an object displayed on the host computing device in a manner indicative of the acceleration of the movable element.

21. A machine-readable medium, disposed in a keyboard, for storing machine-readable instructions that cause the steps of claim 1 to be implemented.

22. A machine-readable medium, storing machine-readable instructions that cause the host computing device to perform the steps of claim 20.

23. A keyboard operatively coupled to a host computing device through a keyboard interface, comprising:
   (a) a movable element that is movable in respect to a single axis, wherein the movable element is other than a selectively switchable key;
   (b) a state change detector that senses a direction and displacement of the movable element;
   (c) a memory that stores machine-readable instructions and a plurality of predefined codes that conform to a keyboard communication protocol, which does not explicitly provide for communicating movement of the movable element; and
   (d) a processor in communication with the state change detector and memory, said processor executing the machine-readable instructions, causing one of the plurality of predefined codes to be selected as a function of a state change to represent the movement of the movable element, said processor transmitting the predefined code as an output signal that conforms to the keyboard protocol, for input to a host computing device.

24. The keyboard of claim 23, further comprising a timer in communication with the state change detector and processor, said timer determining an elapsed time between successive changes of state of the movable element.

25. The keyboard of claim 24, wherein the machine-readable instructions cause the processor to compare the elapsed time to a plurality of threshold times, each of which corresponds to a different speed range of the movable element; and to select the predefined code that is indicative of a speed range of the movable element determined by comparing.

26. The keyboard of claim 23, further comprising a counter in communication with the state change detector and processor, said counter accumulating a number of state changes caused by movement of the movable element.

27. The keyboard of claim 26, wherein the machine-readable instructions cause the processor to compare the number of state changes accumulated to a plurality of different threshold numbers; and cause the processor to assign the predefined code that corresponds to a threshold number determined by comparing.

28. The keyboard of claim 27, wherein the machine-readable instructions further cause the counter to reduce its count of the number of state changes by the threshold number, and again compare a residual count resulting therefrom to the plurality of threshold numbers.

29. The keyboard of claim 23, wherein the machine-readable instructions further cause the processor to select a predefined code as a function of a direction of movement of the movable member.

30. The keyboard of claim 29, wherein the movable member comprises a wheel that is rotatable about a rotational axis, said rotational axis comprising the single axis.

31. The keyboard of claim 23, further comprising a communication interface operatively connected to the processor, said communication interface adapted to communicate the predefined code from the processor to a host computing device.

32. The keyboard of claim 31, wherein the communication interface utilizes a keyboard scan code as the predefined code.

33. The keyboard of claim 31, wherein the communication interface utilizes a Universal Serial Bus (USB) protocol for the output signal.

34. The keyboard of claim 33, wherein the movable element comprises a slider that is movable along the single axis.

35. A keyboard that is separate from a host computing device to which the keyboard is adapted to be operatively coupled, comprising:

(a) a rotatable wheel disposed adjacent to a key area on the keyboard and having an exposed circumferential edge, said rotatable wheel being thus adapted to be selectively rotated about a single axis in either of two opposed directions;

(b) a state change detector operatively coupled to the rotatable wheel, said state change detector sensing a direction and an angular displacement of the rotatable wheel as said wheel is rotated;

(c) a memory that stores machine instructions and a plurality of predefined codes; and (d) a processor in communication with the state change detector and the memory, said processor executing the machine instructions, causing one of the plurality of predefined codes to be selected as a function of state changes that are detected by the state change detector, said processor transmitting the predefined code as an output signal that is adapted to be coupled to and input to a host computing device.

36. The keyboard of claim 35, wherein the plurality of predefined codes comprise one of a plurality of scan codes and a plurality of Universal Serial Bus (USB) reports.

37. The keyboard of claim 35, further comprising a timer in communication with the state change detector and the processor, said timer determining an elapsed time between successive changes of state as the rotatable wheel is rotated.

38. The keyboard of claim 37, wherein the machine-readable instructions cause the processor to compare the elapsed time to a plurality of threshold times, each of which corresponds to a different speed range of the rotatable wheel; and to select the predefined code that is indicative of a speed range of the rotatable wheel determined by comparing.

39. The keyboard of claim 35, further comprising a counter in communication with the state change detector and processor, said counter accumulating a number of state changes caused by rotation of the rotatable wheel.

40. The keyboard of claim 39, wherein the machine-readable instructions cause the processor to compare the number of state changes accumulated to a plurality of different threshold numbers; and cause the processor to assign the predefined code that corresponds to a threshold number determined by comparing.

41. The keyboard of claim 40, wherein the machine-readable instructions further cause the counter to reduce its count of the number of state changes by the threshold number and then to compare a residual count resulting therefrom to the plurality of threshold numbers.

42. The keyboard of claim 35, wherein the machine-readable instructions further cause the processor to select a predefined code as a function of a direction of rotation of the rotatable wheel.

* * * * *